Sept. 3, 1940.    E. J. SCHAEFER    2,213,889
ELECTRIC PROTECTIVE SYSTEM
Filed July 1, 1937
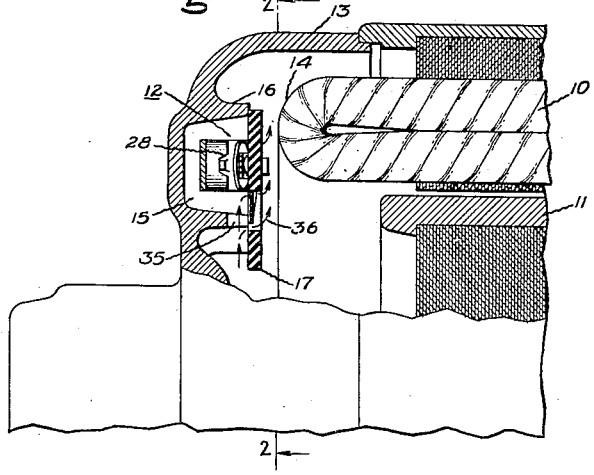
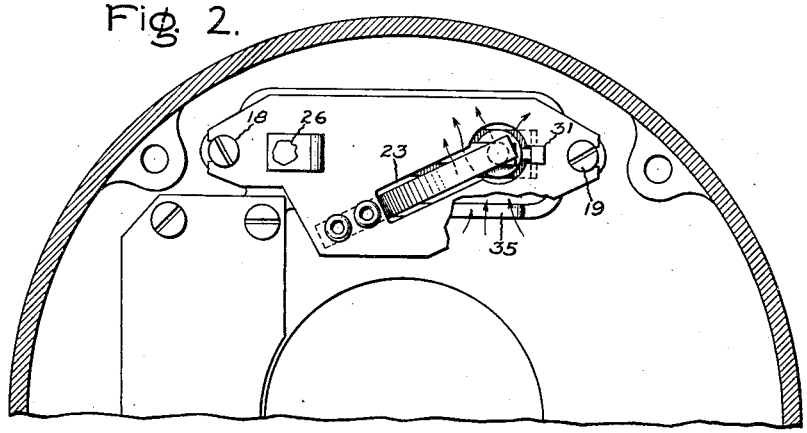
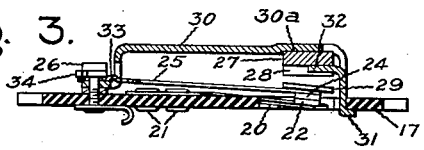
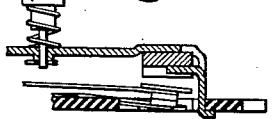  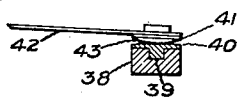
Inventor:
Edward J. Schaefer,
by Harry E. Dunham
His Attorney.

Patented Sept. 3, 1940

2,213,889

UNITED STATES PATENT OFFICE 2,213,889

ELECTRIC PROTECTIVE SYSTEM

Edward J. Schaefer, Fort Wayne, Ind., assignor to General Electric Company, a corporation of New York Application July 1, 1937, Serial No. 151,444

3 Claims. (Cl. 172—36)

My invention relates to electric protective systems, more particularly to systems for protecting electric motors and the like against abnormally high temperatures by reason of an excessive current flowing therethrough, and has for its object a simple, reliable and inexpensive system of this character.

My invention is especially useful in the protection of small electric motors of fractional H. P. size, it being contemplated that the protective apparatus will probably be mounted on the motor.

In the operation of small electric motors having limited starting torque, such as split phase or capacitor motors, it is highly desirable to protect the motor not only from overloads when the motor is running, but also from excessive current during stalled conditions, i. e., when the motor is unable to start the apparatus to which it is connected. Examples of motor applications of this type are the use of split phase induction motors in household refrigerators, stokers, washing machines, etc. It is a further object of my invention to provide means for protecting the motor against both stalled rotor conditions and overload running conditions.

However, the current in the motor under stalled conditions is many times the maximum permissible continuous current under stalled conditions as well as many times the maximum permissible current under continuous running conditions. If the motor starts immediately, the current is reduced quickly and no overheating results. But when the motor cannot start it very quickly overheats.

I have found that a current responsive protective device having characteristics suitable to protect the motor against stalled conditions gives overprotection when the motor is running. In other words, the device, which preferably is of the thermal current type, if heated quickly enough by the stalled current to deenergize the motor, or reduce its energization, before the motor is overheated, becomes heated under running conditions to operate and deenergize the motor by a current less than the maximum permissible continuous running current. This latter result is a very undesirable one since the motor should be permitted to operate with the maximum permissible continuous load.

In carrying out my invention in one form, I provide a thermal current responsive switching device for controlling the motor circuit, which device is responsive to the motor current and also mounted near the stator winding of the motor so as to be responsive to the temperature of the winding. This device is adjusted to operate to protect the motor under stalled conditions. It is so arranged, however, by reason of its direct response to the temperature of the winding that it is heated at proportionately the same rate as the winding when the motor is running. In other words the current setting of the protective device is raised when the motor is running to provide for maximum continuous current in the motor, the device operating also to protect the motor in response to still higher current values.

More particularly, I provide a bimetallic thermostatic element which operates a switch contact, a permanent magnet made of a material having a high coercive force being provided to give snap action. The bimetallic element is connected in the circuit with its contacts so as to be heated by the current through its contacts, and it is mounted near the motor winding so as to be responsive to the temperature of the winding.

For a more complete understanding of my invention reference should be had to the accompanying drawing, Fig. 1 of which is a fragmentary vertical sectional view of an electric motor equipped with a protective device embodying my invention; Fig. 2 is a view partly in section taken along the line 2—2 of Fig. 1 looking in the direction of the arrows; Fig. 3 is a sectional view of the protective device illustrated in Figs. 1 and 2; Fig. 4 is a fragmentary sectional view similar to Fig. 3 but showing a modified form of my invention having provision for manual reset; while Fig. 5 is an enlarged elevation view of a modified form of contact structure.

Referring to Figs. 1, 2 and 3 of the drawing, I have shown my invention in one form as applied to a typical small motor of the split phase type comprising a stator winding 10 and a squirrel cage rotor 11. The protective device 12, in accordance with my invention, is mounted in close proximity to the winding 10, preferably on the end shield 13 of the motor closely adjacent the projecting end turns 14 of the winding. In order to support it in position, the end flange is constructed with a chamber 15 bounded by a flange 16 for the operating mechanism of the protective device.

It will be understood that a split phase motor is provided with at least two running windings and a starting winding. These windings however are interspersed with one another and form a physically unitary winding 14 the temperature of which reflects the current value in any particular winding. Thus the winding 14 may in fact include one or more electrically separate windings depending upon the type of motor used.

The protective device comprises a supporting plate 17, forming a base, made of a suitable insulating material such as a molded phenolic condensation product or fiber this plate being of irregular shape as shown. The thermal current responsive control mechanism is mounted on one side of the plate so as to fit into the chamber 15 when the plate is secured to the end shield over the chamber, it being held in place by suitable screws 18 and 19.

The mechanism comprises a flexible spring switch arm 20 secured by rivets 21 to the plate 17 and having on its free end a contact 22. To provide freedom of movement for this contact arm and also to provide for the circulation of the air entrapped in the motor housing or casing, an elongated aperture 23 is provided in the plate coextensive with the free portion of the contact arm and somewhat larger in outline. A second movable contact 24 is supported on the end of a bimetallic thermostatic strip 25 in position to engage the contact 22, the opposite end of the thermostat being secured to the plate 17 by a rivet 26. It will be observed that under normal conditions, when the contacts are in engagement, as indicated in the drawing, the flexible contact arm 20 is bent into the aperture 23 by the pressure exerted upon it by the thermostat. The rivets 21 and 26 constitute terminal connections for connecting the contacts in the motor circuit, the circuit leading from the rivets 21 through the contact arm 20, the contacts, the bimetallic thermostat 25 and out through the rivet 26.

For the purpose of providing a snap movement, a permanent magnet 27 is provided adjacent the end of the thermostat. This magnet is a block of metal, specifically a small disk or button, having a central groove 28 in one face and suitably magnetized so as to have a north pole and a south pole on this face adjacent the thermostat. These poles are defined by the projections or faces on each side of the groove 28, the groove improving the magnetic performance by reducing the leakage flux from one pole to the other. A disk-shaped armature 29 made of a magnetic material such as soft iron is secured to the end of the thermostat in a position opposite the magnet 27 so as to be drawn into engagement with the face of the magnet when the thermostat bends a predetermined amount in response to an increase in temperature. The armature 29 is arranged at such an angle on the end of the thermostat as to compensate for curvature of the thermostat when heated and thereby lie flat against the face of the magnet.

In order to obtain sufficient magnetic force for effective snap action while at the same time limiting the size of the magnet to practically small proportions, I use as a material for the magnet an alloy having a high coercive force. Preferably I use that alloy consisting of 12% aluminum, 25% nickel, and 5% copper, the balance being mainly iron, such as described and claimed in Patent 1,947,274, issued February 13, 1934, to William E. Ruder and Patent 2,027,997, issued January 14, 1936, to Tokushichi Mishima.

The disk-shaped magnet 27 is secured in position by a metallic supporting strap 30 which extends over the thermostat in parallel spaced relation therewith, one end being held by the rivet 26 and the other end having a tongue 31 lying in a slot provided for it in the plate 17 at the end of the aperture 23 and being bent over against the opposite side of the plate 17. A special mounting is provided for the magnet on the strap 30. This comprises a shallow depression 30a forming a seat for the magnet, which may be struck into the strap 30 by means of a die, and a tab 32 which is struck inward from the metal of the strap and lies in the slot 28. The tab is preferably struck in place by a suitable die and the magnet is simply slipped in place, there being sufficient resiliency in the parts so that the magnet is held firmly in place.

For the purpose of providing for temperature adjustment of the thermostat a projection 33 is provided on the thermostat adjacent the rivet 26, this projection being extruded by a punch or die. Cooperating with this projection 33 is a cam 34 secured in place by the rivet 26 and rotatable about the rivet, although frictionally held quite firmly by the rivet. This cam is eccentric with respect to the rivet and may be rotated into engagement with the projection 33 so as to adjust the position of the free end of the thermostat under normal temperature conditions and in so doing adjust the temperature or current setting of the thermostat. For example, if the current setting is to be increased, the cam 34 is rotated to depress the free end of the thermostat whereby a greater deflection upward of the thermostat and hence a higher current is required for the thermostat to move its contact out of engagement with the contact 22.

The electrical resistance of the thermostat is determined mainly by the requirements of stalled rotor conditions. Preferably, the motor when stalled should not be energized continuously for a period of time long enough for the maximum permissible temperature of the winding to be reached. This is because of the fact that certain parts of the motor, such as the capacitor in a capacitor type motor, are designed for intermittent duty and may be damaged before the winding reaches its maximum permissible temperature in one continuous energized or "on" period. Moreover, a temporarily tight or frozen condition of the apparatus which stalls the motor and prevents it from starting is more apt to be overcome by a large number of short energized periods than by a small number of long energized periods. Therefore, the resistance of the thermostat is so selected that under stalled rotor conditions, it heats at a much more rapid rate than the motor winding. Thus, the thermostat when the motor is first connected to the line under stalled conditions has relatively short and substantially equal energized and deenergized periods. In other words, the thermostat is heated quickly by the current passing through it and deenergizes the motor in a relatively short period of time. And furthermore, the thermostat cools quickly in a relatively short period of time and again energizes the motor.

As this "on" and "off" operation of the thermostat continues, the motor being now assumed to be continuously stalled, the "on" periods become gradually shorter and the "off" periods longer as the temperature of the motor increases. This is due to the increasing temperature of the motor and hence increasing ambient of the thermostat whereby the thermostat is heated to its operating temperature more quickly but requires a longer period in which to cool sufficiently to reclose the motor circuit. Finally under these stalled conditions, assuming that the motor is unable to start the device to which it is connected, an equilibrium condition will be reached under which the motor is deenergized nearly all the time, the thermostat closing the motor circuit for a very short period. Under these conditions the motor winding temperature fluctuates from a low temperature near but somewhat higher than the reclosing temperature of the thermostat, because the thermostat cools more quickly than the winding, and a high temperature depending upon the length of the final "on" period which is a function of the resistance and thermal inertia of the thermostat. Thus, for a relatively high resistance thermostat, the final "on" time may be, for example, three to five seconds, and the high temperature of the motor winding under stalled conditions will be a few degrees higher than the low temperature but lower than the maximum permissible temperature. I prefer this arrangement for capacitor motors in order to give better protection for the capacitor. In a typical device the reclosing temperature was approximately 75° C. and the opening temperature 105° C.

Moreover, under stalled conditions the thermostat necessarily receives some heat directly from the coil 14, heat being radiated from the coil to the base 17 and transmitted from the base to the thermostat by conduction and radiation.

The maximum current that can flow continuously in the winding 14 under stalled conditions without damage to the winding is considerably lower than the maximum permissible continuous current under running conditions. This is because of the higher rate of heat dissipation from the winding when the motor is running due to the agitation of the air entrapped in the tight motor housing whereby heat is carried by convection from the winding to the housing for dissipation to the outside. In other words, under stalled conditions, the winding temperature increases at a rate disproportionately greater than the increase in the rate of heat generation over the running conditions. As a result I have found that if the thermostat is adjusted properly to protect the motor as previously described under stalled conditions, it operates to deenergize the motor under running conditions in response to a current which is less than the maximum permissible continuous current in the winding. This is an undesirable condition because for maximum output of the motor it should be permitted to operate up to the maximum current. Therefore, to obtain the maximum operating capacity from the motor under running conditions the current adjustment of the thermostat must be raised for the running condition.

This increase in the current adjustment is effected in accordance with my invention by providing for access to the thermostat through the walls defining the chamber 15 of the air entrapped in the motor housing. To that end I provide an opening or slot 35 in the lower side of the flange 16 which provides an opening, when the protective device is mounted in place, for a predetermined amount of the air when agitated by operation of the motor to pass into the chamber 15 and out through the aperture 23, as indicated by the arrows 36. The air is at a temperature somewhat lower than the temperature of the winding 14 whereas the thermostat is so constructed that it must be heated to a temperature substantially equal to the temperature of the coil 14 in order to deenergize the motor.

Under motor running conditions the heating of the thermostat results mainly from the transfer of heat from the motor winding to the thermostat. There will of course be a certain amount of heating in the thermostat itself by reason of the current passing through it. In still air, i. e., the stalled condition, this current value may cause a temperature rise of T degrees in the thermostat above the surrounding air. In moving air, as when the motor is running, the temperature rise of the thermostat due to this same current may be only $$\frac{T}{3}$$

above the temperature of the moving air due to the better heat transfer of the moving air. Therefore, the temperature of the thermostat with the motor running is the temperature of the moving air plus $$\frac{T}{3}$$

In a typical case the maximum permissible temperature of the motor winding was 105° C. When the winding reached this maximum temperature while running over overload, the temperature of the entrapped air circulating around the thermostat was 90° C. and the rise in temperature while running over overload, the temperature passing through it was 15° C., making a total thermostat temperature of 105° C. Thus the thermostat was heated to the same temperature as the winding and, since it was so calibrated, it opened the switch at that maximum temperature of 105° C.

If the current were 20% lower the temperature rise in the thermostat due to the current alone would be approximately 10° C. instead of 15° C., and it might be expected that the motor winding would have to be heated to a temperature 5° C. higher before the thermostat opened the switch. In other words, it might be expected that the thermostat would have to be heated by the circulating air to 95° C. which with the 10° rise due to current would cause the thermostat to operate. This is not the case however because the lower the current the lower the rate of temperature rise of the winding and therefore the lower the temperature differential between the winding and the entrapped air agitated around the winding. In other words, the thermostat is heated by the air more nearly to the temperature of the winding. This tends to compensate for the lower temperature rise in the thermostat itself because of the lower current, with the result that the thermostat opens the motor circuit on lower currents at very nearly the same winding temperature as for the heavier currents.

In its operation the thermostat bends sufficiently in response to an increase in temperature, to bring the armature 29 to a predetermined spaced relation with the magnet at which position the armature is snapped into engagement with the poles of the magnet thereby opening the circuit with a snap action. The contact 22 is caused to follow the contact 24 during this preliminary movement of the thermostat by reason of the straightening of the contact arm 20. The motor and the protective device then cool and at some low temperature the pull of the thermostat is sufficient to separate the armature from the poles of the magnet, whereupon the contacts are closed with a snap action and the motor started.

In Fig. 4 I have shown a modified form of my invention in which the thermostat does not generate sufficient force when cold to release the armature and reclose the circuit. In other words, the motor upon being deenergized is not automatically restarted when it has cooled. By means of a button 37, however, the thermostat may be depressed to forcibly disengage the armature from the magnet and reclose the contacts. Preferably however the button cannot be depressed far enough to hold the contacts closed on overload so that the device is trip free of the button.

In Fig. 5 I have shown a modified arrangement of the magnet providing for an arc blowout effect as well as snap action. In this form of my invention the magnet 38 which is in the form of a disk with a central groove 39 is provided with a facing member 40 made of a suitable circuit making and breaking contact material such as silver, this material filling the groove 39. The armature 41 on the thermostat 42 is provided with a facing layer 43 of a contact material such as silver. The engaging faces of the parts of the contacts 40 and 43 are approximately spherical, the point of contact being in the center of the face of the magnet, i. e., between the poles of the magnet. With this arrangement the flux between the poles of the magnet is at right angles to the arc between the two contacts when they are separated and consequently the arc is blown to one side in the direction of the slot 39 and quickly extinguished.

While I have shown the thermostat connected in the circuit of the motor so as to be heated by current passing directly through it, it will be understood that the thermostat may be heated by a resistance heater placed near it through which the motor current passes, the thermostat if desired not being included in the circuit. For purposes of the appended claims the term "thermostat" or "temperature responsive means" is therefore defined to include suitable heating means which may be a separate heating resistance, the temperature responsive means itself as disclosed or a combination of the two.

The protective device forming a part of my invention is described and claimed in my divisional application, Serial No. 232,417, filed September 29, 1938.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. The combination with an electric motor provided with a winding and with a substantially tight enclosing housing in which the entrapped air is agitated around said winding by rotation of said motor, of temperature responsive means mounted on said motor inside said housing adjacent said winding so as to be heated by radiation of heat from said winding, switching means in the circuit of said winding operated by said temperature responsive means to deenergize said winding when said temperature responsive means is heated to a predetermined temperature, electrical connections for heating said temperature responsive means directly by the current in said winding, whereby said temperature responsive means is heated at a rate at least as great under stalled motor conditions as the rate of heating of said winding thereby to operate said switching means before said winding is heated substantially above said predetermined temperature, and walls around said temperature responsive means providing for access to said temperature responsive means of a predetermined amount of the agitated air in said housing when said motor is running thereby to decrease the rate of heating of said temperature responsive means when said motor is running to provide for heating of said temperature responsive means and said winding at substantially the same rate and for heating of said winding substantially to said predetermined temperature under all overload running conditions of said motor after which said temperature responsive means operates said switching means to open the circuit of said winding.

2. The combination with an electric motor provided with a winding and with an enclosing housing in which the air is agitated around said winding by rotation of said motor, of temperature responsive means mounted on said motor inside said housing adjacent said winding so as to be heated by convection and radiation of heat from said winding, switching means in the circuit of said winding operated by said temperature responsive means to deenergize said winding when said temperature responsive means is heated to a predetermined temperature and energize said winding when said temperature responsive means cools to a lower temperature, electrical connections for heating said temperature responsive means directly by the current in said winding, said temperature responsive means operating under stalled motor conditions in response to the current passing through it to energize and deenergize said winding with substantially equal energized and deenergized periods and said temperature responsive means being responsive directly to the rising temperature of said winding by convection and radiation of heat from said winding gradually to shorten the energized periods and lengthen the deenergized periods as the temperature of said winding rises whereby the temperature of said winding is limited under continuous stalled conditions to a value not substantially greater than said predetermined temperature, and the rate of heating of said temperature responsive means when said motor is running being decreased by said agitated air to provide for heating of said temperature responsive means and said winding at substantially the same rate and for the heating of said winding substantially to said predetermined temperature under all overload running conditions of said motor after which said temperature responsive means operates said switching means to open the circuit of said winding.

3. The combination with an electric motor provided with a winding and with a substantially tight enclosing housing in which the entrapped air is agitated around said winding by rotation of said motor, of means for protecting said motor under both stalled and running conditions comprising a thermostat mounted on said motor inside said housing adjacent said winding so as to be heated by radiation from said winding, switching means in the circuit of said winding operated by said thermostat to deenergize said winding when said thermostat is heated to a predetermined temperature which is substantially the same as the maximum permissible continuous operating temperature of said winding and energize said winding when said thermostat cools to a lower temperature, electrical connections for connecting said thermostat in circuit with said winding so as to pass the current in said winding through said thermostat and thereby heat said thermostat by said current, said thermostat being arranged to be heated under stalled motor conditions at a rate at least as great as the rate of heating of said winding whereby said thermostat is heated to said predetermined temperature and operates said switching means to deenergize said winding at least as soon as said winding is heated to said predetermined temperature, and walls secured to the inside of said housing forming an enclosure for said thermostat, said walls being provided with an opening for admitting to said enclosure a predetermined amount of the heated agitated air in said housing when said motor is running to decrease the rate of heating of said thermostat and maintain said thermostat under all motor running conditions at substantially the same temperature as said winding whereby said thermostat operates under all running overload conditions to deenergize said winding only after said winding is heated substantially to said predetermined temperature.

EDWARD J. SCHAEFER.

CERTIFICATE OF CORRECTION.

Patent No. 2,213,889. September 3, 1940.

EDWARD J. SCHAEFER.

It is hereby certified that error appears in the printed specification of the above numbered patent requiring correction as follows: Page 3, second column, line 24, for the word "over" read --under--; lines 27 and 28, strike out "while running over overload, the tem- rent" and insert instead --of the thermostat by reason of the current--; page 4, first column, line 24, strike out the word "in"; and that the said Letters Patent should be read with this correction therein that the same may conform to the record of the case in the Patent Office.

Signed and sealed this 15th day of October, A. D. 1940.

(Seal)

Henry Van Arsdale,
Acting Commissioner of Patents.